(12) United States Patent
Burns et al.

(10) Patent No.: US 11,613,288 B2
(45) Date of Patent: Mar. 28, 2023

(54) CART AND RACK ASSEMBLY

(71) Applicant: BBJ SOLUTIONS, LLC, Perrysburg, OH (US)

(72) Inventors: Brian Burns, Tiffin, OH (US); Brad Burns, Tiffin, OH (US); Jeff Erickson, Toledo, OH (US)

(73) Assignee: BBJ SOLUTIONS, LLC, Perrysburg, OH (US)

( * ) Notice: Subject to any disclaimer, the term of this patent is extended or adjusted under 35 U.S.C. 154(b) by 251 days.

(21) Appl. No.: 17/157,110

(22) Filed: Jan. 25, 2021

(65) Prior Publication Data

US 2021/0229720 A1    Jul. 29, 2021

Related U.S. Application Data

(60) Provisional application No. 62/965,185, filed on Jan. 24, 2020.

(51) Int. Cl.
*B62B 3/10* (2006.01)
*B62B 3/02* (2006.01)
(Continued)

(52) U.S. Cl.
CPC .............. *B62B 3/108* (2013.01); *B62B 3/002* (2013.01); *B62B 3/02* (2013.01); *B62B 3/04* (2013.01);
(Continued)

(58) Field of Classification Search
CPC .... B65D 19/42; B65D 19/44; B65D 19/0093; B65D 19/0095; B65D 19/0038; B65D 2519/00815; B65D 2519/00333; B65D 2519/00293; B65D 2519/00323; B65D 2519/00273; B65D 2519/00029; B65D 2519/00064; B65D 2519/00034; B65D 2519/00069; B65D 2519/00781; B65D 85/48; B62B 2206/006; B62B 2501/00; B62B 3/108; B65G 49/062
(Continued)

(56) References Cited

U.S. PATENT DOCUMENTS

2,760,647 A * 8/1956 Saul, Jr. .................... B62B 3/02
                                                            248/220.31
2,839,198 A * 6/1958 Lefevre ................ B65G 49/062
                                                                206/451
(Continued)

*Primary Examiner* — Patrick D Hawn
(74) *Attorney, Agent, or Firm* — Jacob M. Ward; Ward Law Office LLC (57) ABSTRACT

A cart and rack assembly for transporting a planar material includes a rack and a cart. The rack includes a frame coupled to a base. The frame has an upper portion and a lower portion. The upper portion has a first width, and the lower portion has a second width. The cart is configured to reversibly receive the base. The cart includes a guide member configured to guide either of the base or the cart into a predetermined position when the base is received by the cart. The assembly further includes a bracket having a first end and a second end which is configured to selectively secure the planar material to the assembly. The base has a series of apertures configured to accept the first end of the bracket. The second end of the bracket is configured to be selectively coupled with the upper portion of the frame.

16 Claims, 6 Drawing Sheets

(51) Int. Cl.
*B62B 3/04* (2006.01)
*B62B 5/00* (2006.01)
*B62B 3/00* (2006.01)
*B65D 19/42* (2006.01)
*B65D 19/44* (2006.01)
*B65D 19/00* (2006.01)

(52) U.S. Cl.
CPC ............ *B62B 5/00* (2013.01); *B65D 19/0093* (2013.01); *B65D 19/42* (2013.01); *B65D 19/44* (2013.01); *B62B 2203/00* (2013.01); *B62B 2206/006* (2013.01); *B62B 2501/00* (2013.01); *B65D 2519/00781* (2013.01); *B65D 2519/00815* (2013.01)

(58) Field of Classification Search
USPC .................................. 211/41.14, 41.15, 41.16
See application file for complete search history.

(56) References Cited

U.S. PATENT DOCUMENTS

| | | | | |
|---|---|---|---|---|
| 2,940,402 | A * | 6/1960 | Hansen | B61D 3/16 296/3 |
| 2,978,270 | A * | 4/1961 | Verheggen | B65G 49/062 211/41.14 |
| 3,878,942 | A * | 4/1975 | Hansen | B65D 85/48 211/49.1 |
| 3,955,676 | A * | 5/1976 | Hansen | B65G 49/062 211/49.1 |
| 5,163,695 | A * | 11/1992 | Pakowsky | B62B 3/108 248/434 |
| 5,411,360 | A * | 5/1995 | Hilliker | B65G 49/062 108/53.5 |
| 5,755,339 | A * | 5/1998 | Belanger | B65G 49/062 211/41.14 |
| 5,906,282 | A * | 5/1999 | Aldrich | B65G 49/062 206/454 |
| 6,296,262 | B1 * | 10/2001 | Skinner | B62B 3/108 280/35 |
| 6,386,376 | B1 * | 5/2002 | Mendoza-Castillo | B65G 49/066 224/403 |
| 6,478,281 | B2 * | 11/2002 | Turner | A47B 97/04 40/518 |
| 6,536,607 | B1 * | 3/2003 | Knoll | B66F 9/07504 211/41.14 |
| 6,910,591 | B2 * | 6/2005 | Knoll | B65G 49/062 211/41.14 |
| 7,004,483 | B1 * | 2/2006 | McEntee | B62B 3/008 280/43.23 |
| 7,264,126 | B1 * | 9/2007 | Bergeron | B65G 49/062 211/41.15 |
| 7,527,274 | B2 * | 5/2009 | Strauss | B65G 49/062 211/41.15 |
| 8,006,984 | B2 * | 8/2011 | Chubb | B65G 49/062 280/33.998 |
| 8,348,287 | B1 | 1/2013 | Smith | |
| 8,376,291 | B1 * | 2/2013 | Groves | B25H 1/04 182/180.1 |
| 8,789,710 | B1 * | 7/2014 | Moore | B62B 1/20 211/41.14 |
| 9,381,930 | B2 * | 7/2016 | Septimio | B62B 3/04 |
| 10,106,294 | B2 * | 10/2018 | Böttcher | A47B 47/0075 |
| 10,336,528 | B2 * | 7/2019 | Fuller | B65D 88/129 |
| 2005/0067360 | A1 * | 3/2005 | Darvial | B65D 85/48 211/41.1 |
| 2015/0166268 | A1 * | 6/2015 | McHugh | B65G 49/062 211/41.14 |
| 2015/0368029 | A1 * | 12/2015 | Kronsteiner | B65D 85/48 211/85.8 |
| 2019/0202599 | A1 * | 7/2019 | Dickson | B65D 85/48 |
| 2019/0232858 | A1 * | 8/2019 | Dickson | B65D 19/44 |
| 2019/0283145 | A1 * | 9/2019 | Sargent | F16M 11/048 |
| 2021/0387767 | A1 * | 12/2021 | Servaes | B65G 49/062 |

* cited by examiner

CART AND RACK ASSEMBLY

CROSS REFERENCE TO RELATED APPLICATIONS

This application claims the benefit of U.S. Provisional Application Ser. No. 62/965,185, filed on Jan. 24, 2020. The entire disclosure of the above application is incorporated herein by reference.

FIELD

The disclosure generally relates to transport carts and, in particular, to a cart for carrying a planar material such as granite.

INTRODUCTION

This section provides background information related to the present disclosure which is not necessarily prior art.

There are numerous materials which are commonly used as countertop materials in kitchens around the world. These materials include laminate, wood, sheet metal, tile, glass, porcelain, quartz and stone. Drawbacks of these countertop materials include their weight and overall fragility. A large stone slab intended for a cabinet or island in a homeowner's kitchen may weigh several hundred pounds. Most facilities where stone countertops are produced have one or more crane lifts to aid in moving the slab from one place to another. These lifts are used to load the slab on to a truck for delivery to a customer.

Over the years, numerous styles of carts have been used to move stone slabs. The purpose of the transport cart is to safely load and transport the individual pieces of the overall countertop on trucks without damage. Fragile pieces of stone that are placed on the traditional carts are prone to breaking as the cart twists or bends when lifted with a forklift. Also, as the cart is transported down the road, traditional carts are not designed to absorb the shock and vibrations which lead to cracked, broken, or damaged pieces arising from these vibrations and the slabs rubbing against one another.

Drawbacks of these known carts include their unstable structure and where such carts are only able to accommodate a single slab of material. For example, U.S. Pat. No. 8,348,287 discloses a slab cart for sheet material which includes a dolly component, a shelf component, and a mechanism for coupling the shelf component to the dolly component in a pivotable manner. The cart is particularly adapted to support a single slab of material.

There is a continuing need for a rack that can support multiple slabs of material while also militating against costly damage that may occur in transport of the material. Desirably, the rack can easily be received by a cart.

SUMMARY

In concordance with the instant disclosure, a rack that can support multiple slabs of material while also militating against costly damage thereto, and that can easily be received by a cart, has surprisingly been discovered.

Cart and rack assemblies for transporting a planar material are provided that include a rack and a cart. The rack may include a frame and a base. The frame may have an upper portion and a lower portion. The upper portion may have a first width and the lower portion may have a second width. The frame may be configured to support the planar material. The base may be coupled to the frame and may further support the planar material. The cart may be configured to reversibly receive the base. The cart may have a guide member configured to guide either of the base or the cart into a predetermined position when the base is received by the cart.

Ways of using the cart and rack assembly for transporting the planar material are also provided. These may include a method where a cart and rack assembly is provided having a rack with at least one aperture. The method may also include a step of providing a cart configured to reversibly receive the rack. The cart may have a guide member configured to guide either of the rack or the cart into a predetermined position when the rack is received by the cart. The method may further include a step of lifting the rack through the at least one aperture. The method may also include a step of lowering the rack onto the cart. Next, the method may have a step of guiding either of the rack or the cart into a predetermined position with the guide member.

In an exemplary embodiment, the frame may include a plurality of frame members which form an A-shaped structure. The A-shaped structure is adapted to support multiple slabs of materials in a generally upright position. In certain embodiments, the A-frame may be formed by a plurality of outer members that are affixed to cross members. In particular embodiments, the outer members may be disposed at an angle relative to the cross members, where the cross members are transverse to the outer members.

In a more particular example, the cross members may have a greater length toward the bottom of the A-frame and have lesser length at the top of the A-frame. The difference in length between the cross members creates an outer member that is angled, which facilitates transporting the slab in a stable position. It should be appreciated that two outer frame members angled toward each other creates two independent surfaces, which facilitates the rack to hold multiple slabs.

Further, the base may have a center frame surrounded by two support platforms. In particular examples, there are two support platforms, and each support platform is parallel to the opposing support platform. Each support platform may have a plurality of pads that are adapted to support the slab. In certain embodiments, the A-frame may be attached to the base on the center frame, and further disposed between the two support platforms.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 3:
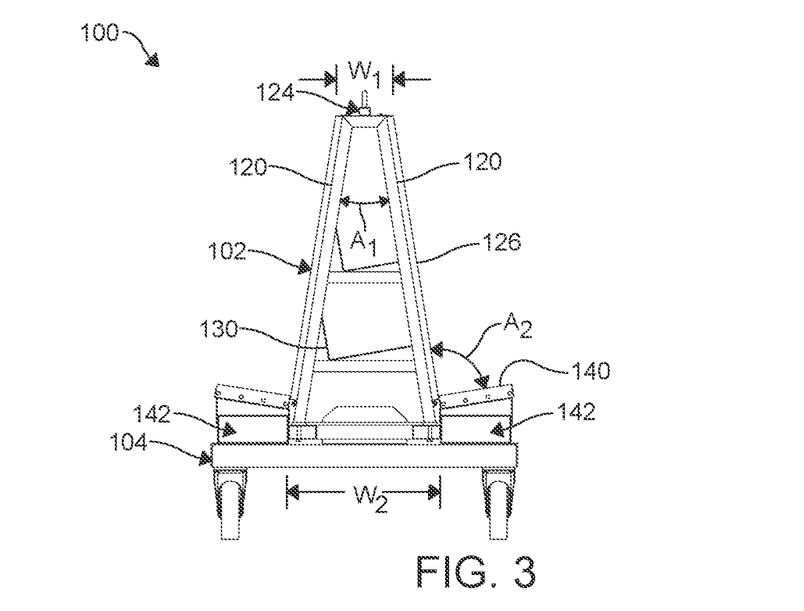
FIG. 3 is a front elevational view of the cart and rack assembly, as shown in FIGS. 1-2.
Figure 4:
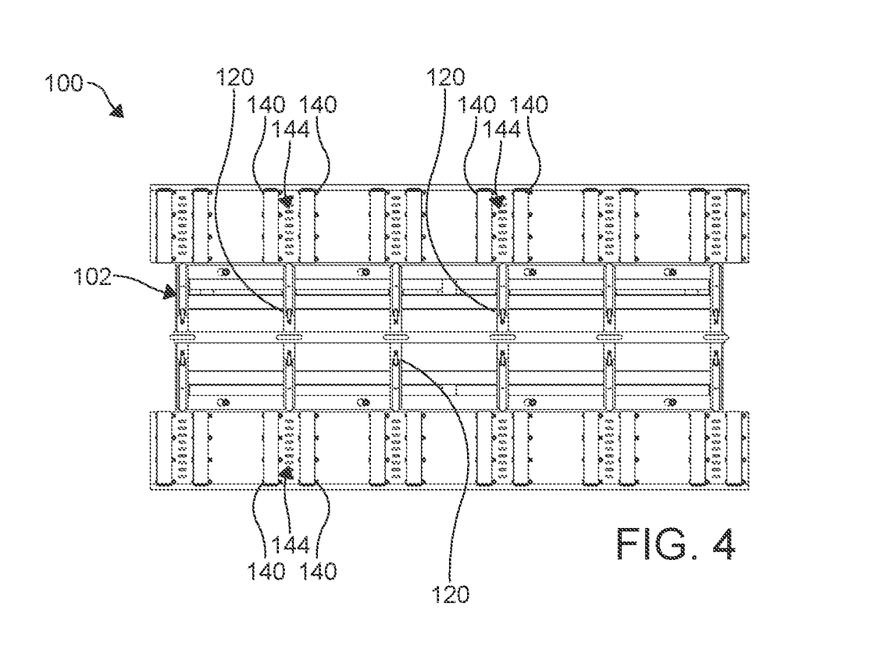
FIG. 4 is a top plan view of the cart and rack assembly, as shown in FIGS. 1-3.
Figure 5:
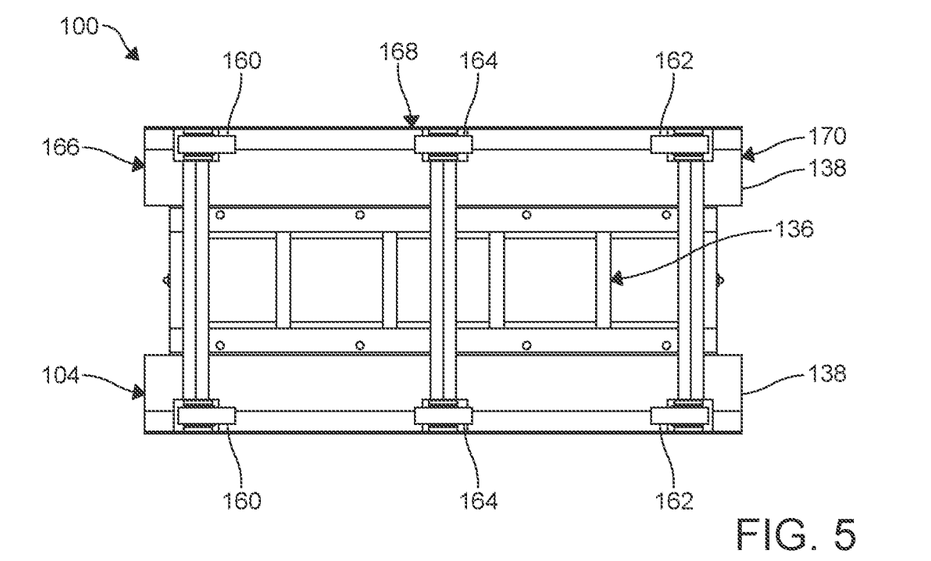
FIG. 5 is a bottom plan view of the cart and rack assembly, as shown in FIGS. 1-4.
Figure 6:
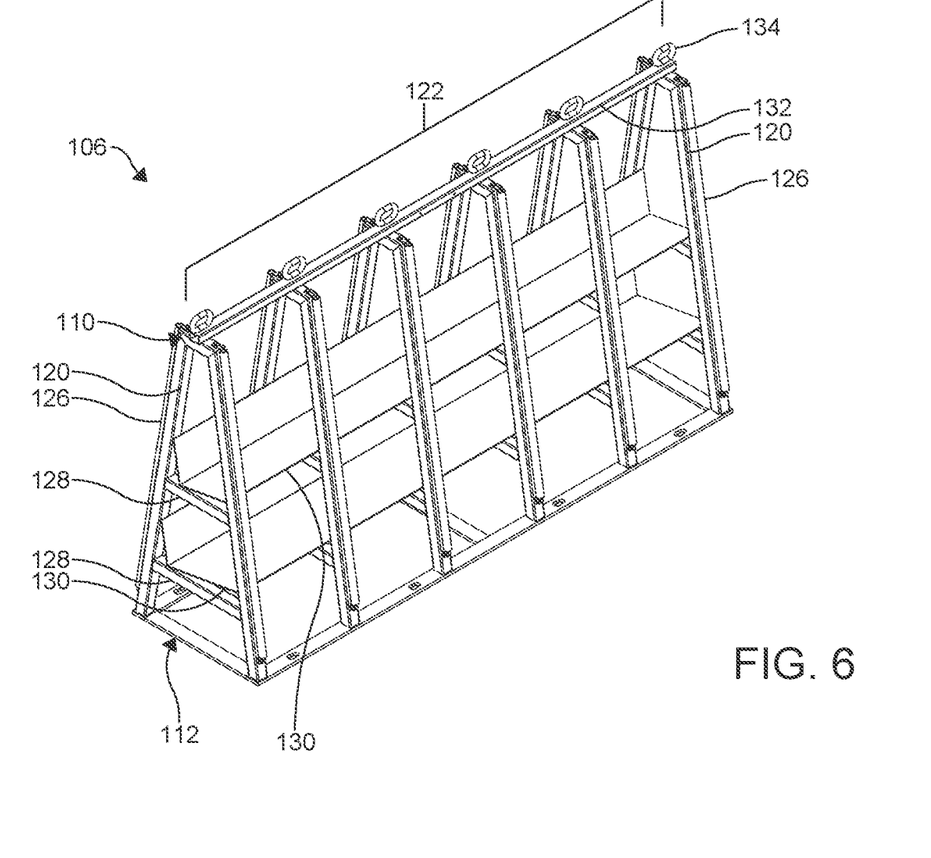
FIG. 6 is a front perspective view of the frame in the cart and rack assembly, according to one embodiment of the present disclosure.
Figure 7:
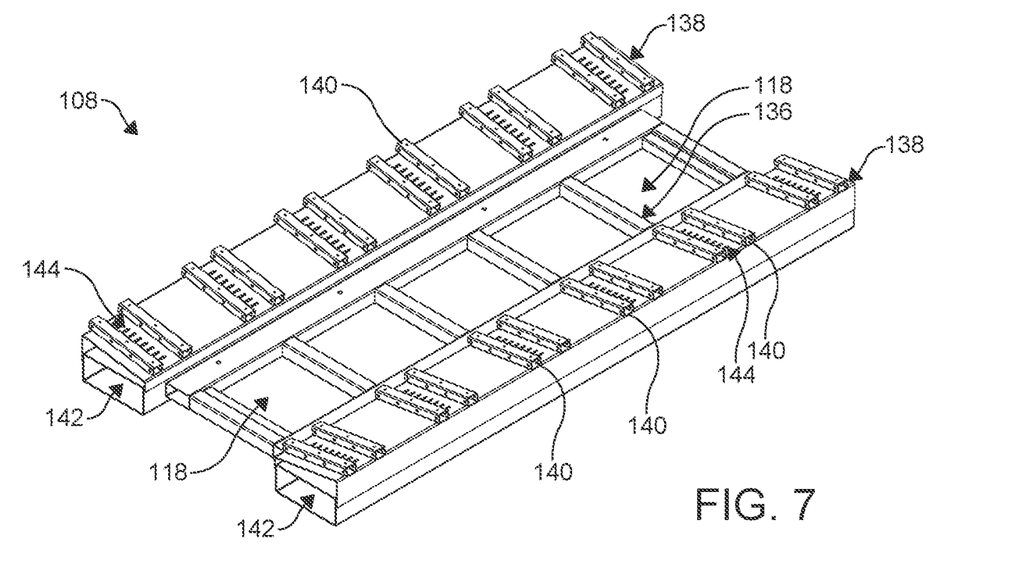
FIG. 7 is a front perspective view of the base in the cart and rack assembly, according to one embodiment of the present disclosure.
Figure 8:
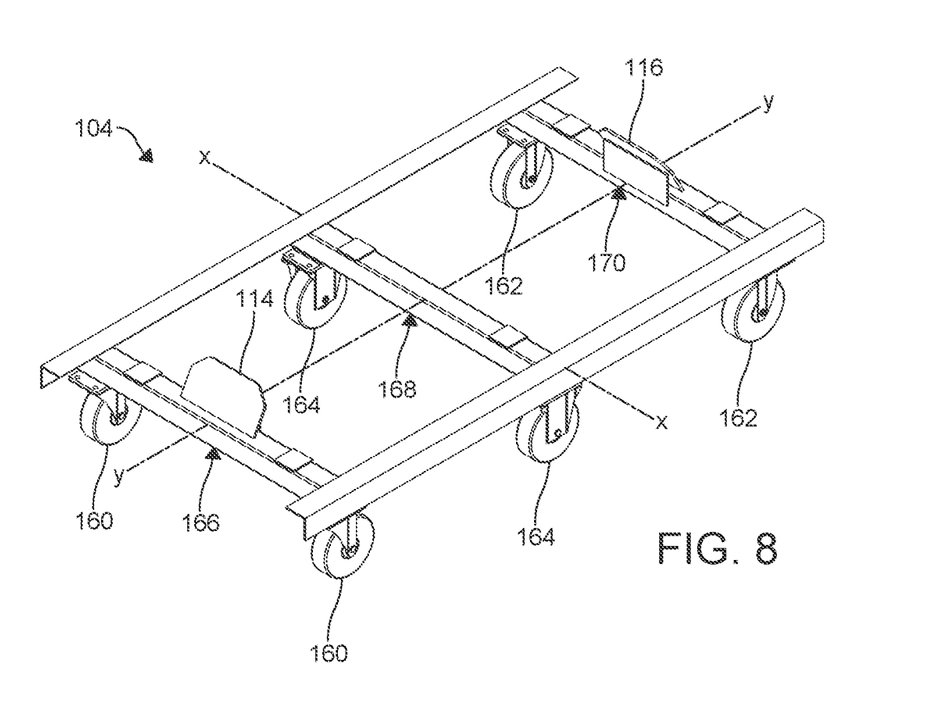
FIG. 8 is a front perspective view of the cart in the cart and rack assembly, according to one embodiment of the present disclosure.
Figure 10:
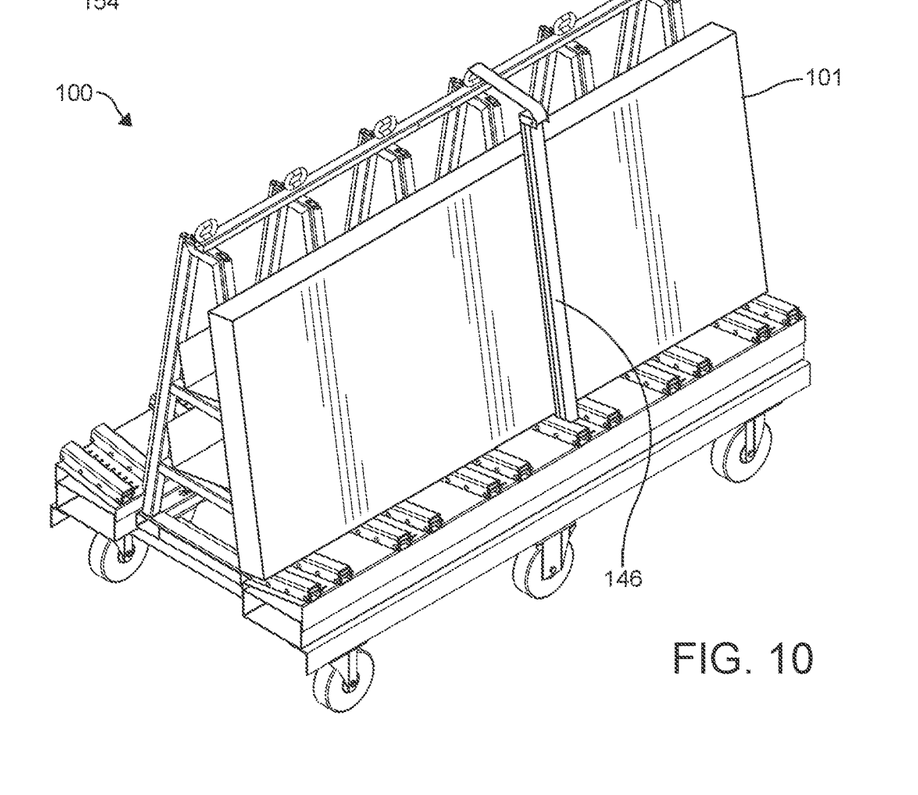
FIG. 10 is a front perspective view of the cart and rack assembly of FIGS. 1-5, further depicting the bracket from FIG. 9 securing the planar material to the cart and rack assembly, according to one embodiment of the present disclosure.

As shown in FIGS. 1-8, a cart and rack assembly 100 for transporting a planar material 101 is provided which includes a rack 102 and a cart 104. Non-limiting examples of the planar material 101 may include laminate, wood, sheet metal, tile, porcelain, quartz, stone, and glass, including where such materials are configured as countertop or tabletop materials. The rack 102 may include a frame 106, as shown in FIG. 6, and a base 108, as shown in FIG. 7. The frame 106 may have an upper portion 110 and a lower portion 112. The upper portion 110 may have a first width W1 and the lower portion 112 may have a second width W2, as shown in FIG. 3. As shown in FIG. 10, the frame 106 may be configured to support the planar material 101. The base 108 may be coupled to the frame 106 and may further support the planar material 101. The cart 104, as shown in FIG. 8, may be configured to reversibly receive the base 108. The cart 104 may have a guide member 114, 116 configured to guide either of the base 108 or the cart 104 into a predetermined position when the base 108 is received by the cart 104.

Figure 1:
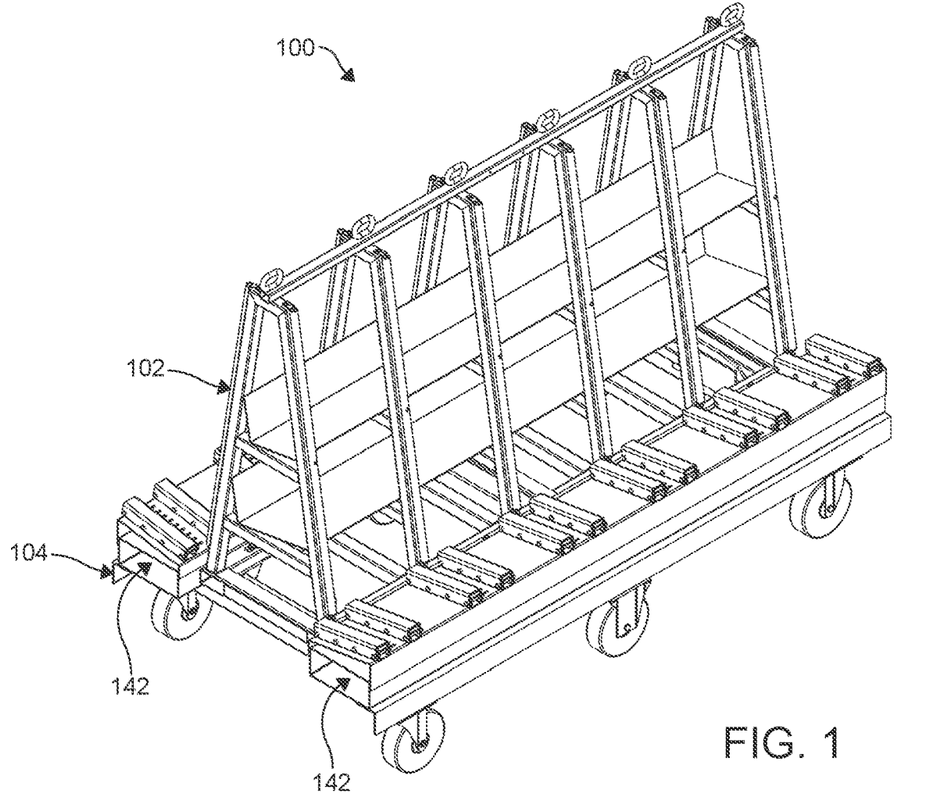
FIG. 1 is a front perspective view of a cart and rack assembly for transporting a planar material, according to one embodiment of the present disclosure.
Figure 2:
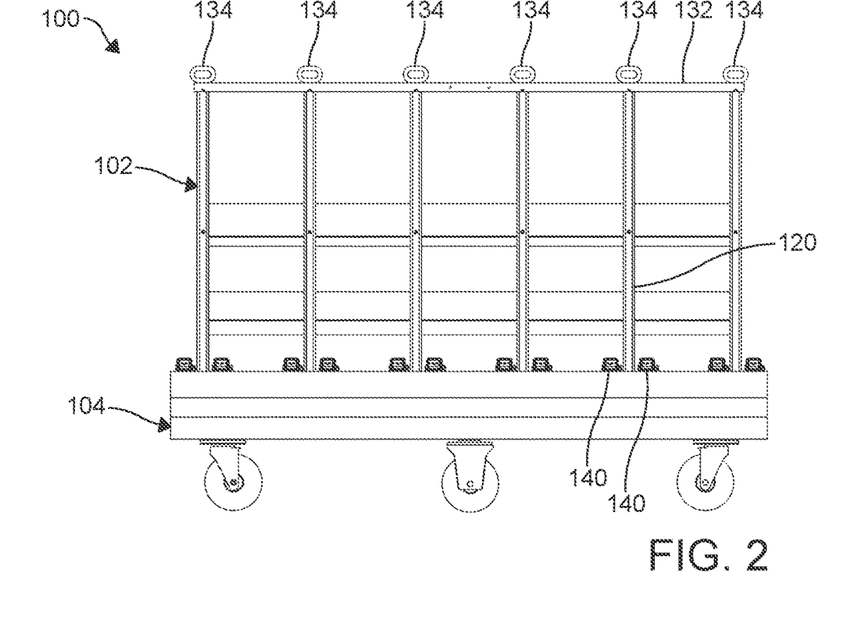
FIG. 2 is a side elevational view of the cart and rack assembly, as shown in FIG. 1.

In one example, as shown in FIGS. 1, 3, and 8, the guide member 114, 116 may include a first guide plate 114 disposed proximate one end of the cart 104 and a second guide plate 116 disposed proximate another end of the cart 104. The first guide plate 114 and the second guide plate 116 may be configured to be received within apertures 118 in the base 108. In operation, a single user with a transportation device (not shown) such as a forklift, may place the rack 102 onto the cart 104 without needing additional operators or spotters to ensure the rack 102 is correctly positioned on the cart having each of the first guide plate 114 and the second guide plate 116. Advantageously, the first guide plate 114 and the second guide plate 116 may enhance the efficiency and repeatability of guiding either of the rack 102 or the cart 104 into the predetermined position. One skilled in the art may select other suitable methods of guiding the rack 102 and the cart 104, within the scope of the present disclosure.

With continued reference to FIGS. 1, 3, and 8, the first guide plate 114 and the second guide plate 116 may each be disposed at an angle transverse to a plane relative to the surface upon which the cart 104 rests. The plane is further represented by an x-axis and a y-axis as indicated in FIG. 8. Each of the first guide plate 114 and the second guide plate 116 may also include one or more portions that are tapered or beveled. Advantageously, the tapers or bevels of each of the first guide plate 114 and the second guide plate 116 may guide contact between the guide members 114, 116 and the rack 102 to allow the cart 104 to more easily be received within the apertures 118 of the base 108. A skilled artisan may select other guide plate 114, 116 designs to allow the cart 104 to be more easily received by the base 108 of the rack 102, within the scope of the present disclosure.

It should be appreciated that the removable nature of the base 108 and the frame 106 allow the planar material 101 to be removed from the cart 104 while still disposed on the base 108 and the frame 106, thereby securing and maintaining the planar material 101 in a substantially immovable position. This is advantageous for transport of the material, where it may be undesirable for the planar material 101 to move.

In another example, as shown in FIGS. 1-4, and 6, the frame 106 may include a plurality of upright members 120. The plurality of upright members 120 may further be provided in pairs. The pairs of upright members 120 may form a series of A-shaped frames along a length 122 of the frame 106. In a more specific example, the pairs of upright members 120 of each A-frame may form a first angle A1 of about 18-degrees at an apex 124 of each A-frame, as shown in FIG. 3. The first angle A1 may project from the upper portion 110 of the frame 106 to the lower portion 112 of the frame 106. Advantageously, the frame 106 having the first angle A1 of about 18-degrees may improve the overall support of the planar material 101. One skilled in the art may select another suitable shape or angle of the frame 106 to militate against damage to the planar material 101, within the scope of the present disclosure.

With continued reference to FIGS. 1-4, and 6, each upright member 120 may further include a cushion 126 disposed outwardly from the frame 106. The cushion 126 may be constructed from a non-marking, non-petroleum-based hose. The cushion 126 may be configured to provide a back pressure to transport the planar material 101 more securely in conjunction with various securing means, such as one or more straps or brackets. Desirably, the improved support of the cushion 126 may militate against damage to planar material 101 during transport by providing shock absorption and minimizing vibration.

As shown in FIGS. 1, 3, and 6, each pair of the upright members 120 may include a crossmember 128. The frame 106 may further include one or more splash racks 130 coupled to at least one crossmember 128. Advantageously, the splash rack 130 may provide a convenient location to retain tools and installation materials during transport. The splash rack 130 can also be used to hold and transport various lengths of one or more backsplashes (not shown), for example, when the cart and rack assembly 100 is used for transporting countertop material.

In a particular example, with continued reference to FIGS. 1, 3, and 6, a support beam 132 may be disposed across the upper portion 110 of the frame 106. In a more particular example, the support beam 132 may include a plurality of coupling points, such as hoops 134, that are configured to receive a strap system (not shown). In an even more particular example, the hoops 134 may be elongated to accommodate a strap system (not shown) with hooks. Advantageously, by providing the support beam 132 across the upper portion 110 of the frame 106, the structural integrity of the rack 102 may be enhanced. Desirably, the plurality of hoops 134 on the support beam 132 provides a convenient and practical means for attaching the strap system (not shown). A skilled artisan may other suitable methods for attaching the strap system (not shown), within the scope of the present disclosure.

In another example, as shown in FIGS. 1, 5, and 7, the base 108 may include a ladder frame 136 disposed between a pair of support platforms 138, and each support platform 138 may be parallel to the opposing support platform 138. Desirably, the pair of support platforms 138 provide a plurality of locations to support planar materials (not shown). In a more specific example, the lower portion 112 of the frame 106 may be coupled to the ladder frame 136 of the base 108. The frame 106 may be disposed between the pair of support platforms 138. Each support platform 138 may have a plurality of pads 140 that are adapted to support the planar material 101. Advantageously, the pads 140 may be formed using a rubber covered by a braided nylon jacket or a fire hose for added durability and protection. The pads 140 can be resilient and provide back pressure when securing the planar material to the rack 102, as well as providing shock absorption and minimizing vibration when loading and transporting the planar materials using the cart and rack assembly 100. The base 108 may also further include one or more apertures 142 for receiving forklift tines (not shown). These apertures 142 can be positioned to receive tines of various types of lifting apparatus, including those having predetermined or standard tine spacing, allowing the rack 102 to be either removed or placed upon the cart 104.

As shown in FIGS. 1, 4, and 7, each support platform 138 may include a plurality of aperture arrays 144. Each aperture array 144 may be sandwiched by a pair of the pads 140. Each aperture array 144 may align with one of the upright members 120. In a specific example, each of the pads 140 may be disposed at a second angle A2 of about 90-degrees from an upright member 120 of the frame 106, as shown in FIG. 3. Advantageously, the second angle A2 of the pads 140 are configured to support substantially the entire edge surface of a planar material 101 for enhanced support and to militate against the planar material 101 from undesirably falling off the cart and rack assembly 100. A skilled artisan may select other arrangements for providing the pads 140 or aperture arrays 144, within the scope of the present disclosure. In certain embodiments, the first angle A1 at the apex 124 of each A-frame and an angle and position of the pads 140 can be varied but selected to maintain the second angle A2 at about 90-degrees. That is, the extent of deviation from vertical of the planar material on the rack 102 can be changed as desired, but maintenance of the second angle A2 at about 90-degrees militates against the planar material moving or sliding on the surface of the pads 140, where a majority of the weight of the planar material is supported by the pads 140 on the base 108.

Figure 9:
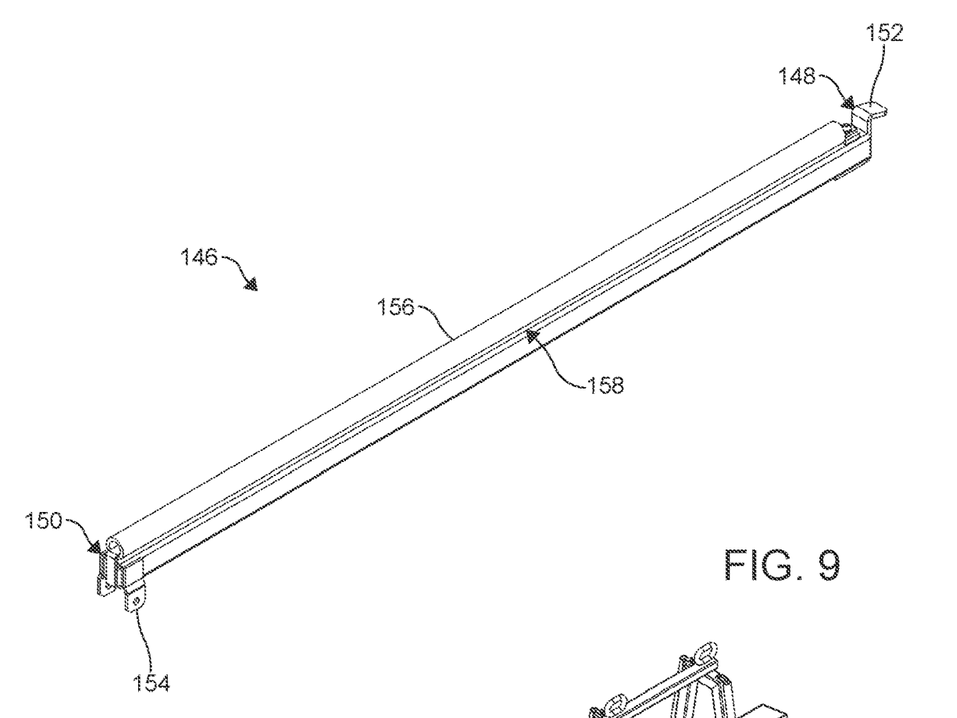
FIG. 9 is a front perspective view of a bracket for securing the planar material to the cart and rack assembly, according to one embodiment of the present disclosure.

As shown in FIG. 9, the cart and rack assembly 100 may further include a bracket 146 configured to secure the planar material 101. The bracket 146 may have a first end 148 and a second end 150. The first end 148 of the bracket 146 may have a protrusion 152 configured to be disposed in an aperture of one of the plurality of aperture arrays 144. The second end 150 of the bracket 146 may include an adaptor 154 configured to selectively couple to the upper portion 110 of the frame 106. In a further example, the adaptor 154 may be configured to selectively couple to the strap system (not shown), which then may be selectively coupled to the hoops 134. In a specific example, as shown in FIG. 10, the bracket 146 may be disposed directly across from one of the upright members 120 when the planar material is loaded onto the rack 102. In other words, the each of the plurality of aperture arrays 144 may be in-line with one of the upright members 120. By disposing the bracket 146 directly across from an upright member 120, the planar material 101 may be sandwiched between the bracket 146 and the upright member 120 providing a clamping force that is evenly distributed across a length (not shown) of the planar material 101, in operation. This sandwiching force places the pressure on the planar pieces directly where there are upright members 120, thereby more fully supporting the planar material 101 and may decrease the risk of stressing and/or breaking the planar material 101 when secured to the rack 102.

With continued reference to FIG. 9, the bracket 146 may further include a buffer 156 disposed on an interior surface 158 of the bracket 146. The buffer 156 may be constructed from a non-marking, non-petroleum-based hose. The buffer 156 may be configured to provide a back pressure to transport the planar material 101 more securely. Like the cushion 126, the buffer 156 can be configured in certain embodiments as a non-marking, non-petroleum-based hose. Advantageously, the even distribution of clamping force across the length of the planar material 101 and the buffer 156 may militate against the planar material 101 from being damaged during transport. The buffer 156 can provide shock absorption and minimize vibration when transporting the planar material using the cart and rack assembly 100. A skilled artisan may select another method of providing an even distribution of clamping force across a length (not shown) of the planar material 101, within the scope of the present disclosure.

With reference to FIGS. 1-3, 5, and 8, the cart 104 may have a plurality of wheels 160, 162, 164 that enable the cart 104 to transport the planar material 101 more easily. In certain embodiments, the cart 104 may have a first terminal end 166, a middle portion 168, and a second terminal end 170. The middle portion 168 may be between the first terminal end 166 and the second terminal end 170. There may be a first set of wheels 160 attached to the cart 104 adjacent to the first terminal end 166, a second set of wheels 162 attached to the cart 104 adjacent to the second terminal end 170, and a third set of wheels 164 adjacent the middle portion 168. In a particular example, the wheels 160, 162, 164 may be fixed or swivel, and may be any suitable material chosen by a skilled artisan. In an even more particular non-limiting example, the first set of wheels 160 and second set of wheels 162 may swivel, while the third set of wheels 164 may not swivel. In a most particular example, the cart 104 may have six wheels 160, 162, 164, with two of the wheels 160 offset to allow 360-degree spinning of the cart 104 with little effort and greater maneuverability.

As a non-limiting example, the frame 106, the base 108, and the cart 104 may be manufactured using a metal, plastic, a composite material, or any other suitable material chosen by a skilled artisan.

Figure 11:
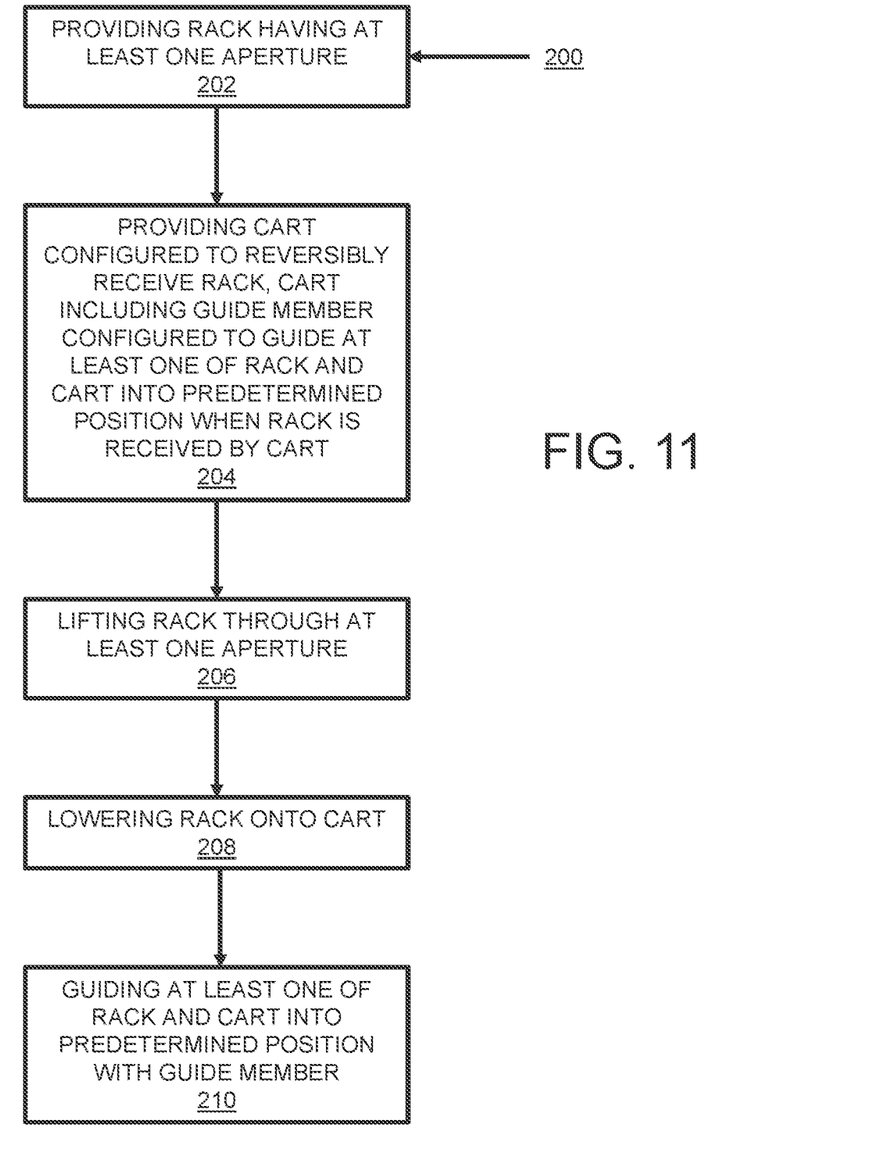
FIG. 11 is a flowchart of a method for using the cart and rack assembly, shown in FIGS. 1-8, according to one embodiment of the present disclosure.

Ways of using the cart and rack assembly 100 for transporting the planar material 101 are also provided. As shown in FIG. 11, these may include a method 200 having a step 202 where the cart and rack assembly 100 is provided with at least one aperture 142 in the rack 102. The method may also include a step 204 of providing a cart 104 configured to reversibly receive the rack 102. The cart 104 may have a guide member 114, 116 configured to guide either of the rack 102 or the cart 104 into a predetermined position when the rack 102 is received by the cart 104. The method 200 may further include a step 206 of lifting the rack 102 through the at least one aperture 142. The method 200 may also include a step 208 of lowering the rack 102 onto the cart 104. Next, the method 200 may have a step 210 of guiding either of the rack 102 or the cart 104 into a predetermined position with the guide member 114, 116.

Advantageously, the cart and rack assembly 100 is configured to support multiple slabs of planar material 101 while also militating against costly damage. The rack 102 is further configured to be easily received by a cart 104.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A cart and rack assembly for transporting a planar material, comprising: a rack including a frame and a base; the frame including an upper portion having a first width and a lower portion having a second width, the frame configured to support the planar material; the base coupled to the frame and supporting the frame; and a cart configured to reversibly receive the base, the cart including a guide member configured to guide at least one of the base and the cart into a predetermined position when the base is received by the cart;
   wherein the frame includes a plurality of upright members, pairs of the upright members forming a series of A-frames along a length of the frame, a first width of the upper portion of the frame being less than a second width of the lower portion of the frame;
   wherein each pair of upright members include a crossmember and the frame further comprises a splash rack coupled to at least one crossmember;
   wherein the base includes a ladder frame disposed between a pair of support platforms;
   wherein the lower portion of the frame is coupled to the ladder frame of the base and the frame is disposed between the pair of support platforms.

2. The cart and rack assembly of claim 1, wherein the guide member includes a first guide plate disposed proximate one end of the cart and a second guide plate disposed proximate another end of the cart, wherein the first guide plate and the second guide plate are configured to be received within apertures in the base.

3. The cart and rack assembly of claim 2, wherein the first guide plate and the second guide plate are each disposed at an angle transverse to a plane of the cart.

4. The cart and rack assembly of claim 3, wherein each of the first guide plate and the second guide plate include a tapered or beveled portion that guides contact between the rack and the cart into a predetermined position when the first guide plate and the second guide plate are received within the apertures of the base.

5. The cart and rack assembly of claim 1, wherein the pairs of the upright members of each A-frame form a first angle of about 18-degrees at an apex of each A-frame projecting from the upper portion of the frame to the lower portion of the frame.

6. The cart and rack assembly of claim 1, further comprising a cushion disposed outwardly on each of the upright members.

7. The cart and rack assembly of claim 1, further comprising a support beam disposed longitudinally across the upper portion of the frame.

8. The cart and rack assembly of claim 1, wherein the base includes at least one aperture for receiving a forklift tine.

9. The cart and rack assembly of claim 1, wherein each support platform includes a plurality of aperture arrays, each aperture array sandwiched by a pair of pads and aligning with one of the upright members.

10. The cart and rack assembly of claim 9, wherein the pads are disposed at a second angle of 90-degrees from at least one upright member of the frame.

11. The cart and rack assembly of claim 10, further comprising a bracket configured to secure the planar material.

12. The cart and rack assembly of claim 11, wherein the bracket has a first end and a second end, the first end of the bracket has a protrusion configured to be disposed in at least one of the plurality of apertures, and the second end of the bracket has an adaptor configured to selectively couple to the upper portion of the frame.

13. The cart and rack assembly of claim 12, wherein the bracket is disposed directly across from one of the upright members relative to the planar material, sandwiching the planar material to provide a clamping force that is evenly distributed across a length of the planar material, in operation.

14. The cart and rack assembly of claim 11, wherein the bracket includes a buffer.

15. A cart and rack assembly for transporting a planar material, comprising:
   a rack including a frame and a base;
   the frame including an upper portion having a first width and a lower portion having a second width, the frame configured to support the planar material;
   the base coupled to the frame and supporting the frame;
   a cart configured to reversibly receive the base, the cart including a guide member configured to guide at least one of the base and the cart into a predetermined position when the base is received by the cart;
   the guide member includes a first guide plate disposed proximate one end of the cart and a second guide plate disposed proximate another end of the cart, wherein the first guide plate and the second guide plate are configured to be received within apertures in the base;
   the first guide plate and the second guide plate are each disposed at an angle transverse to a plane of the cart;
   each of the first guide plate and the second guide plate include a portion that is shaped into a trapezoid and are configured to be more easily received within the apertures of the base;
   the frame includes a plurality of upright members, pairs of upright members forming a series of A-frames along a length of the frame, a first width of the upper portion of the frame being less than a second width of the lower portion of the frame;
   the pairs of upright members of each A-frame form a first angle of about 18-degrees at an apex of each A-frame projecting from the upper portion of the frame to the lower portion of the frame;
   a cushion disposed outwardly on each of the upright members;
   each of the A-frames includes a crossmember and the frame further comprises a splash rack coupled to at least one crossmember;
   a support beam disposed across the upper portion of the frame;
   the base includes a ladder frame disposed between a pair of support platforms;
   the base includes at least one aperture for receiving a forklift tine;
   the lower portion of the frame is coupled to the ladder frame of the base and the frame is disposed between the pair of support platforms;
   each support platform includes a plurality of aperture arrays, each aperture array sandwiched by a pair of pads and aligning with one of the upright members;
   the pads are disposed at a second angle of 90-degrees from at least one upright member of the frame;
   a bracket configured to secure the planar material, the bracket having a first end and a second end, the first end of the bracket has a protrusion configured to be disposed in at least one of the plurality of aperture arrays, and the second end of the bracket has an adaptor configured to selectively couple to the upper portion of the frame, the bracket is disposed directly across from one of the upright members relative to the planar material, sandwiching the planar material to provide a clamping force that is evenly distributed across a length of the planar material, in operation; and the bracket has a buffer.

16. A method of using a cart and rack assembly, the method comprising the steps of: providing a rack including a frame and a base, the frame including an upper portion having a first width and a lower portion having a second width, the frame configured to support the planar material, the base coupled to the frame and supporting the frame; providing a cart configured to reversibly receive the base, the cart including a guide member configured to guide at least one of the base and the cart into a predetermined position when the base is received by the cart; wherein the frame includes a plurality of upright members, pairs of the upright members forming a series of A-frames along a length of the frame, a first width of the upper portion of the frame being less than a second width of the lower portion of the frame;

wherein each pair of upright members include a cross-member and the frame further comprises a splash rack coupled to at least one crossmember;

wherein the base includes a ladder frame disposed between a pair of support platforms;

wherein the lower portion of the frame is coupled to the ladder frame of the base and the frame is disposed between the pair of support platforms;

and performing one of: lifting the rack off of the cart when the base is received by the cart; and lowering the rack onto the cart so that the base is received by the cart.

\* \* \* \* \*